G. W. CARPENTER.
Feed Apparatus for Thrashing Machines.
No. 59,555.  Patented Nov. 13, 1866.
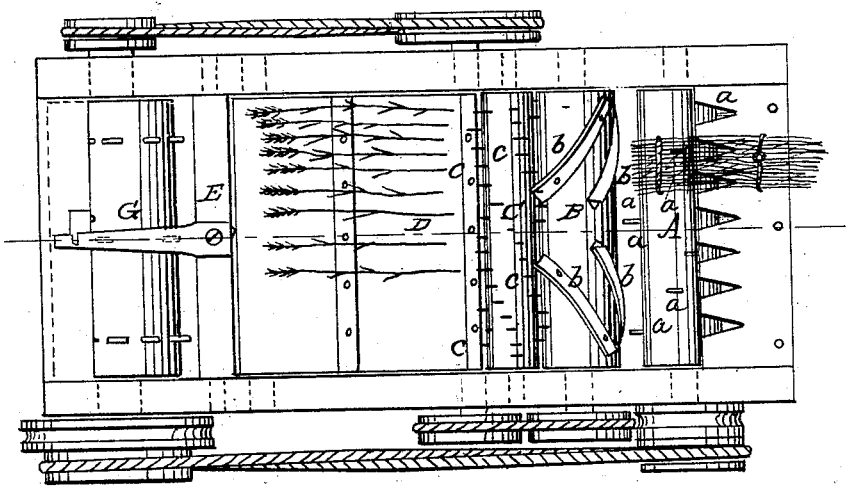
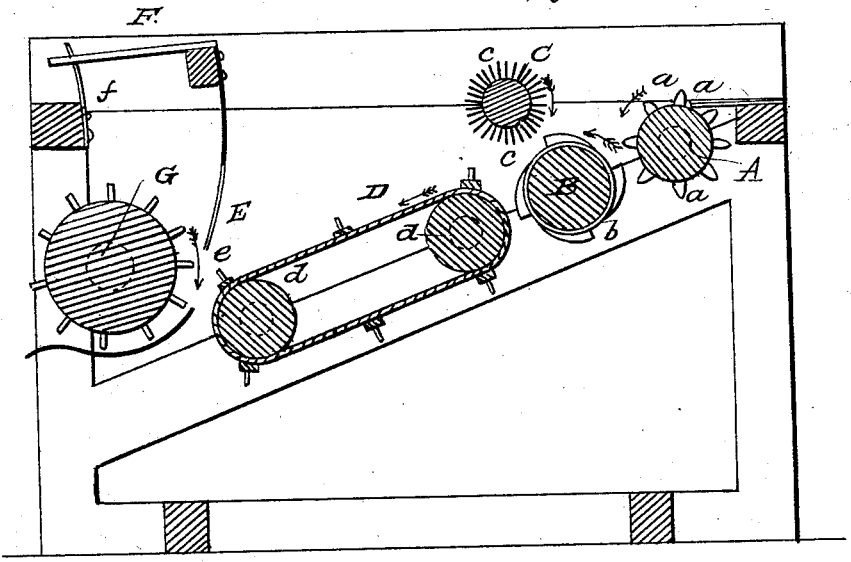

UNITED STATES PATENT OFFICE.

GEORGE W. CARPENTER, OF MEDINA, MICHIGAN.

IMPROVEMENT IN FEED APPARATUS FOR THRASHING-MACHINES.

Specification forming part of Letters Patent No. 59,555, dated November 13, 1866.

*To all whom it may concern:*

Be it known that I, GEORGE W. CARPENTER, of Medina, in the county of Lenawee and State of Michigan, have invented a new and Improved Feed Apparatus for Thrashing-Machines; and I do hereby declare that the following is a full, clear, and exact description thereof, which will enable others skilled in the art to make and use the same, reference being had to the accompanying drawings, forming part of this specification, in which—

Figure 1 is a plan view of the feed apparatus as applied to a thrashing-machine. Fig. 2 is a vertical section of the same, taken in the line $x$ $x$, Fig. 1.

Similar letters of reference indicate like parts.

This invention relates to improvements in a grain-thrashing machine; and consists in a self-feeding apparatus to be attached to cylinder thrashing-machines of ordinary construction, for the purpose of cutting the bands of the bundles and spreading the straw evenly, which is then conveyed and fed regularly to the thrashing-cylinder.

At one end of the machine is placed transversely a roller, A, on which are set spirally around the periphery a series of projecting knives, $a$ $a$, for cutting the bands of the bundles of the straw which are laid upon it.

Immediately forward of the band-cutter A, but a little lower in the position of its axis, is placed another parallel roller or cylinder, B, on the face of which are fastened double rows of flanges $b$ $b$, which run upon the ends of the cylinder spirally, rising toward the middle, where they nearly meet, and terminate abruptly.

When the bundle of straw has passed over the roller A and had the bands severed by the knives $a$ $a$, it falls upon the cylinder B, and the spiral flanges or shakers $b$ $b$ catch against it, throw the straw outward, and spread it evenly.

To prevent the straw from rising, and to bear it down upon the spreading-cylinder B, a roller, C, is hung directly over it, on the face of which are set several spiral rows of projecting pins or teeth, $c$ $c$, which aid in separating and spreading the straw evenly. From the spreading-roller B the straw passes upon an endless apron, D, which travels upon the rollers $d$ $d$, and conveys the spread straw to and under an oscillating or wing gate, E, which is divided into fingers $e$ $e$, the points of which reach nearly down upon the apron D, and are raised or lowered to regulate the feed by a lever, F, which holds the gate E at any point by catching in a ratchet, $f$.

My invention is embraced in and confined to the feed apparatus for a thrashing-machine, above described, to be connected with a cylinder thrasher, G, as shown in the drawings, for the purpose of feeding it regularly, with the straw spread evenly over the surface.

Motion may be given to the apparatus by any suitable gearing connected with the power for working the thrashing-machine.

Having described my invention, what I claim as new, and desire to secure by Letters Patent, is—

The roller A and its band-cutters $a$ $a$, the cylinder B and its spreaders $b$ $b$, the roller C and its teeth $c$ $c$, the thrashing-belt D, and the wing-gate E, combined, arranged, and connected with a thrashing-machine for feeding the same, substantially as herein described.

GEORGE W. CARPENTER.

Witnesses:
 NELSON RICE,
 ALVIN D. RICE.